United States Patent [19]

Ikegami et al.

[11] Patent Number: 4,841,547

[45] Date of Patent: Jun. 20, 1989

[54] DIGITAL COMMUNICATION SYSTEM

[75] Inventors: Fumio Ikegami, 5-7010 Yuniumi Manshion, 34-10 Kohatauchihata, Uji-shi, Kyoto-fu; Susumu Yoshida, Kyoto; Tsutomu Takeuchi, Kyoto; Sirikiat Ariyavisitakul, Kyoto, all of Japan

[73] Assignees: Fumio Ikegami; Mitsubishi Denki Kabushiki Kaisha, both of Tokyo, Japan

[21] Appl. No.: 47,319

[22] Filed: May 8, 1987

[30] Foreign Application Priority Data

May 13, 1986 [JP] Japan .................. 61-111673

[51] Int. Cl.$^4$ ............................. H04L 27/18
[52] U.S. Cl. ...................... 375/53; 332/9 R; 375/86; 375/101
[58] Field of Search ............ 375/52, 53, 54, 57, 375/67, 83, 84, 85, 86, 101, 56; 329/104, 105, 110; 332/9 R, 10, 16, 21, 22

[56] References Cited

U.S. PATENT DOCUMENTS

| | | | |
|---|---|---|---|
| 4,174,505 | 11/1979 | Querry | 332/9 R |
| 4,210,879 | 7/1980 | Poitevin et al. | 332/9 R |
| 4,417,219 | 11/1983 | Brossard et al. | 332/9 R |
| 4,726,038 | 2/1988 | Ikegami et al. | 375/86 |

OTHER PUBLICATIONS

Nossen and Volertas, "Unidirectional Phase Shift Keying", National Telecommunications Conference (Nov. 27–29, 1979), vol. 2, pp. 33.5.1–33.5.5.
Yoshida et al, "A Novel Anti-Multipath Modulation Technique DSK", IEEE Global Telecommunications Conference, Globecom '85 (Dec. 2–5, 1985), vol. 3, pp. 36.4.1–36.4.5.
Institute of Electronics and Communication Engineers, Japan, Aug. 30, 1984, "A Modulation Technique Suffering from Less Timing Fluctuation of Eye Patterns in Multipath Fading".

Primary Examiner—Benedict V. Safourek
Attorney, Agent, or Firm—Lowe, Price, LeBlanc, Becker & Shur

[57] ABSTRACT

A digital communication system, in which digital information is represented by a quaternary information symbol (11, 01, 00, 10) and the double step phase shift, each step represented by ($\pi/4$, $3\pi/4$, $5\pi/4$, $7\pi/4$), is performed per ½ time slot in correspondence to each information symbol, so that the number of phase shift per unit time in the case of the identical transmission rate can be decreased to ½, as compared with a $\Delta\theta/2$-DSK system, and expansion of the bandwidth can be decreased to ½.

3 Claims, 3 Drawing Sheets

DIGITAL COMMUNICATION SYSTEM

BACKGROUND OF THE INVENTION

1. Field of the Invention

The present invention relates to a digital communication system. More particularly, it relates to a digital communication system employed in mobile radio communication which is immune from multipath interference.

2. Description of the Prior Art

The inventors proposed "A MODULATION TECHNIQUE SUFFERING FROM LESS TIMING FLUCTUATION OF EYE PATTERNS IN MULTIPATH FADING", in a technical meeting sponsored by the Institute of Electronics and Communication Engineers in Japan held in Aug. 30, 1984. This article describes a DSK (Double Phase Shift Keying) of a type in which a phase is shifted every half time slot by $\pi/2$. However, an amount of phase-shift is not limited to $\pi/2$, but any amount $\Delta\theta/2$ may be taken, which is referred to as "$\Delta\theta/2$-DSK".

FIG. 1 is a diagram for explaining a $\Delta\theta/2$-DSK signal, FIG. 2 is a diagram showing a T/2 (T: 1 time slot) differential detector, FIG. 3 is a diagram showing the relation between a D wave and a U wave, and FIG. 4 is a diagram showing demodulation outputs in sections b and d and a section c in the $\Delta\theta/2$-DSK signal.

The $\Delta\theta/2$-DSK signal shown in FIG. 1 is such that the phase of a carrier wave is shifted by $+\Delta\theta/2$ during a period of T/2 in the first half of a time slot and further by $\Delta\theta/2$ during a period of T/2 in the second half thereof clockwise or counterclockwise, in correspondence to a digital binary information symbol. In order to demodulate an original binary information data from the $\Delta\theta/2$-DSK signal shown in FIG. 1, a T/2 delay circuit shown in FIG. 2 is employed. In FIG. 2, the $\Delta\theta/2$-DSK signal is applied to an input terminal 1, and the $\Delta\theta/2$-DSK signal is applied to a T/2 delay circuit 3a and a multiplier 2. A output of the multiplier 2 is outputted through a low pass filter 4 to an output terminal 5.

Referring now to FIGS. 1 and 2, description is made on operation of a demodulator. The $\Delta\theta/2$-DSK signal is such that the phase of the carrier wave is shifted by $+\Delta\theta/2$ during a period of T/2 in the first half and further by $+\Delta\theta/2$ during a period of T/2 in the second half with respect to a binary information symbol "1", while the phase of the carrier wave is shifted by $-\Delta\theta/2$ during a period of T/2 in the first half and further by $-\Delta\theta/2$ during a period of T/2 in the second half with respect to a bianry information symbol "0".

Description is now made on operation of multipath reception which presents a problem in mobile radio. Assuming that $\tau$ is an arrival time difference between the D wave and the U wave which are the $\Delta\theta/2$-DSK signals having the identical content and received through two routes having different propagation path lengths, the relation is shown in FIG. 3. Even when the D wave and the U wave are out-of-phase and cancel with each other in sections b and d, the phase difference between the D and U waves in the section c is $\Delta\theta/2$, thus the resultant of the D and U waves is not canceled.

When a combined wave of the D wave and the U wave having such a relation is demodulated in the T/2 differential detector shown in FIG. 2, a demodulation output $e(t)$ is represented by the following expressions:

section a:

$$2e(t) = \begin{cases} (\cos\Delta\theta/2) \cdot (1 - \rho^2) & \text{symbol } 0 \to 1 \\ (\cos\Delta\theta/2) \cdot (1 + \rho^2 + 2\rho\cos(\Delta\theta/2 - \phi)) & \text{symbol } 1 \to 1 \\ -(\cos\Delta\theta/2) \cdot (1 - \rho^2) & \text{symbol } 1 \to 0 \\ -(\cos\Delta\theta/2) \cdot (1 + \rho^2 + 2\rho\cos(\Delta\theta/2 + \phi)) & \text{symbol } 0 \to 0 \end{cases}$$

sections b, d:

$$2e(t) = \begin{cases} (\cos\Delta\theta/2) \cdot (1 + \rho^2 + 2\rho\cos\phi) & \text{symbol } 1 \\ -(\cos\Delta\theta/2) \cdot (1 + \rho^2 + 2\rho\cos\phi) & \text{symbol } 0 \end{cases}$$

section c:

$$2e(t) = \begin{cases} (\cos\Delta\theta/2) \cdot (1 + \rho^2 + 2\rho\cos(\Delta\theta/2 - \phi)) & \text{symbol } 1 \\ -(\cos\Delta\theta/2) \cdot (1 + \rho^2 + 2\rho\cos(\Delta\theta/2 + \phi)) & \text{symbol } 0 \end{cases}$$

where $\cos\Delta\theta/2$ is referred to as the amplitude coefficient, $\rho$ represents the relative amplitude ratio of the U wave to the D wave and $\phi$ represents the carrier phase difference between the D wave and the U wave. The relation is illustrated in FIG. 4.

As seen from FIG. 4, in the $\Delta\theta/2$-DSK signal, the demodulation outputs in the sections b and d and in the section c are in compensating relation with respect to the change of the carrier phase difference $\phi$, so that one is decreased while the other is increased.

More specifically, in a simple BPSK (Binary Phase Shift Keying) signal, when the phase difference $\phi$ between the D wave and the U wave approaches to $\pi$(rad), the demodulation output is reduced so that a bit error occurs, while in the $\Delta\theta/2$-DSK signal, even if the phase difference $\phi$ takes on $\pi$(rad), the demodulation signal does not drop. As a result, the bit error rate is extremely reduced.

Since the $\Delta\theta/2$-DSK signal is constructed as described above, the bit error rate is remarkably improved, as compared with the BPSK signal. However, since the phase is shifted per ½ time slot, the bandwidth of a signal expands, which has presented a problem especially in application to a communication system in which the bandwidth of transmission media must be strictly limited.

SUMMARY OF THE INVENTION

Therefore, a primary object of the present invention is to provide a digital communication system in which expansion of the bandwidth at the identical transmission rate can be controlled at a low level.

Briefly stated, the present invention is concerned with a digital communication system employing a signal which shifts the carrier phase in correspondence to a digital information symbol, where the digital information symbol is multi-valued and the corresponding phase shift is performed in double steps per time slot in correspondence to each multi-valued information symbol.

Therefore, in accordance with the present invention, if the digital information is multi-valued to m-ary symbol where $m=2^n$ (N: integer), the phase shift per unit time in the case of the identical transmission rate can be decreased to 1/n, as compared with a $\Delta\theta/2$-DSK system, so that expansion of the bandwidth can be decreased to 1/n.

According to a preferred embodiment of the present invention, the multi-valued information symbol is a quaternary information symbol (11, 01, 00, 10) and the phase shift per ½ time slot corresponding to the quaternary information symbol is represented by $(\pi/4, (\frac{3}{4})\pi, (5/4)\pi, (7/4)\pi)$.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
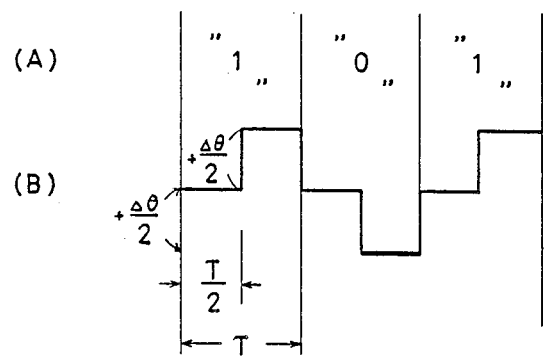
FIG. 1 is a diagram for explaining a $\Delta\theta/2$-DSK signal.
Figure 2:
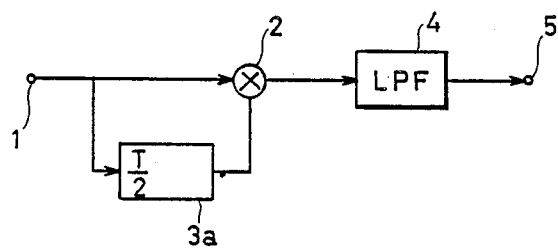
FIG. 2 is a block diagram showing a T/2 differential detector.
Figure 3:
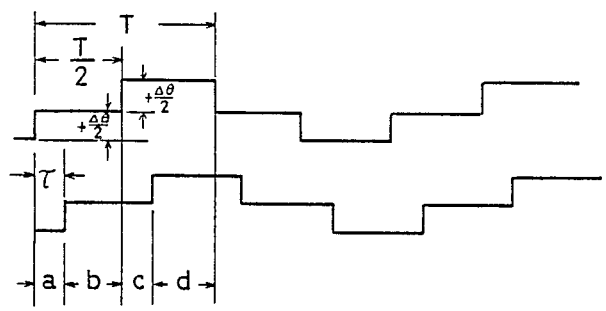
FIG. 3 is a diagram showing the relation between a D wave and an U wave.
Figure 4:
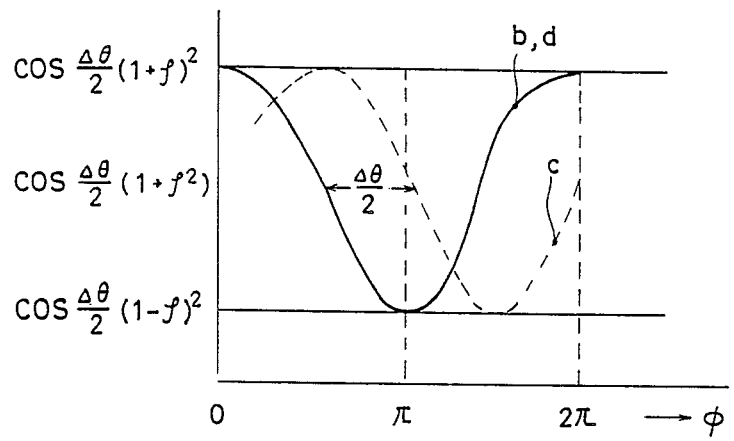
FIG. 4 is a diagram showing demodulation outputs in sections b and d and a section c of the $\Delta\theta/2$-DSK signal.
Figure 5A:
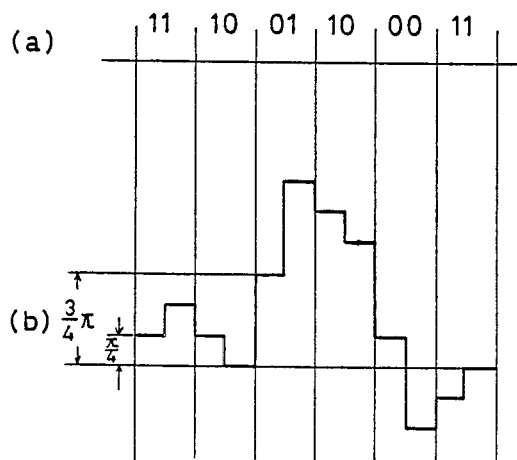
FIGS. 5A and 5B are diagrams for explaining a quaternary DSK signal according to an embodiment of the present invention.
Figure 5B:
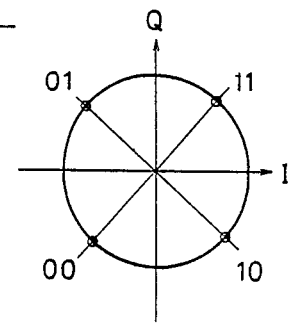
Figure 6:
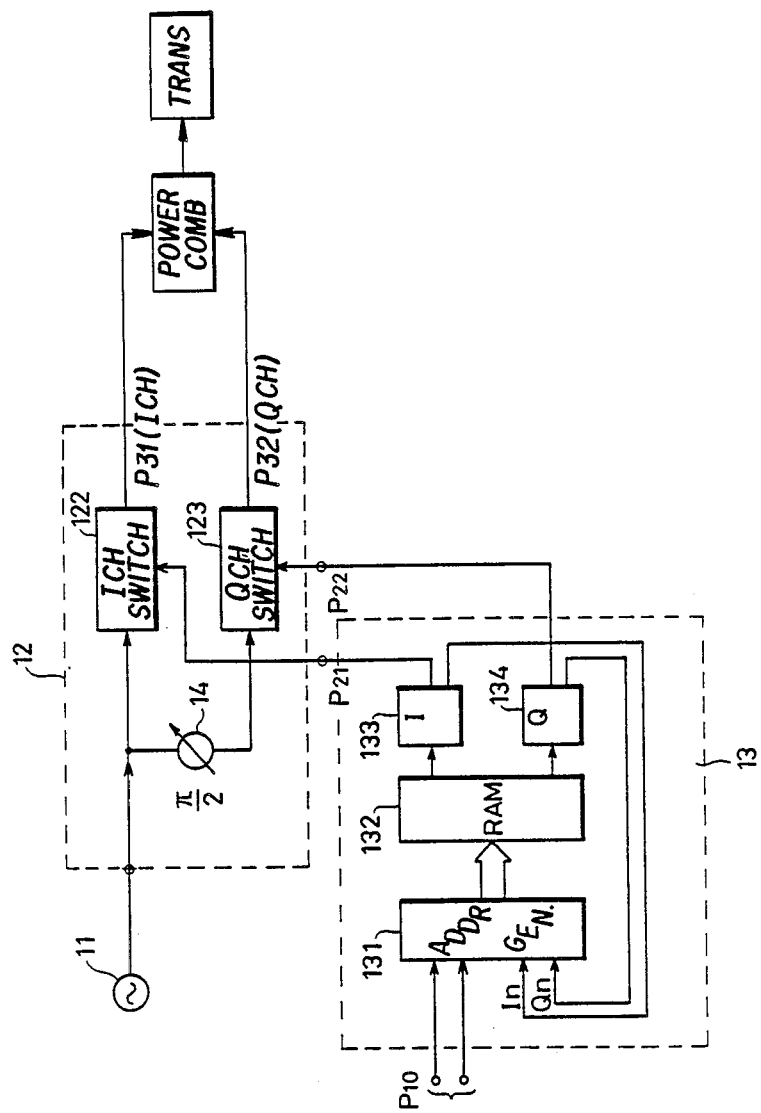
FIG. 6 is a schematic block diagram showing an example of a quaternary DSK signal generator for generating the quaternary DSK signal.

FIG. 5 is a diagram for explaining a quaternary DSK signal employed in an embodiment of the present invention, and FIG. 6 is a schematic block diagram showing an example of a quaternary DSK signal generator for generating the quaternary DSK signal.

Referring now to FIG. 6, description is made on a structure of the quaternary DSK signal generator. A carrier wave signal generator 11 generates a carrier wave signal, the carrier wave signal being applied to an I-Q modulator 12. The I-Q modulator 12 comprises a $\pi/2$ phase shifter 121, an $I_{CH}$ switching circuit 122 and a $Q_{CH}$ switching circuit 123. The $\pi/2$ phase shifter 121 shifts, by $\pi/2$ rad, the phase of a carrier wave applied from the carrier wave signal generator 11. The $I_{CH}$ switching circuit 122 switches an $I_{CH}$ carrier wave into the phase 0, the phase $\pi$ or the amplitude 0 in correspondence to an $I_{CH}$ modulating signal applied through a terminal $P_{21}$. The $Q_{CH}$ switching circuit 123 switches a $Q_{CH}$ carrier wave into the phase 0, the phase $\pi$ or the amplitude 0 in correspondence to a $Q_{CH}$ modulating signal applied through a terminal $P_{22}$.

As an example, the $I_{CH}$ switching circuit 122 and the $Q_{CH}$ switching circuit 123 comprise a double-balanced modulator, in which the $I_{CH}$ carrier wave is controlled such that it is the phase 0 at $+1$, the phase $\pi$ at $-1$ and the amplitude 0 at 0.

The quaternary DSK signal generator further comprises a modulating signal generator 13. The modulating signal generator 13 comprises an address generator 131, a RAM 132, an $I_{CH}$ driver 133 and a $Q_{CH}$ driver 134. The address generator 131 generates an addressing signal showing how the $I_{CH}$ switching circuit 122 and the $Q_{CH}$ switching circuit 123 are to be controlled, in response to a quaternary information signal applied through a terminal $P_{10}$ and based on the control state of the above described $I_{CH}$ switching circuit 122 and the $Q_{CH}$ switching circuit 123 corresponding to the preceding quaternary information signals. The RAM 132 is addressed by the addressing signal generated in the address generator 131. Instructions stored in advance in the RAM 132 are read out in response to the addressing signal applied from the address generator. The $I_{CH}$ driver 133 and the $Q_{CH}$ driver 134 convert the instructions read out from the RAM 132 in the form of control signals required for the above described $I_{CH}$ switching circuit 122 and the $Q_{CH}$ switching circuit 123.

Description is now made on operation. According to an embodiment of the present invention, the amount of phase shift per ½ time slot corresponding to each quaternary information symbol is selected as shown in FIG. 5B and the phase shift of the carrier wave corresponding to a quaternary information signal (11, 10, 01, 10, 00, 11) shown in FIG. 5A(a) is shown in FIG. 5A(b).

Such a signal is generated by forming orthogonal signals (the $I_{CH}$ carrier wave and the $Q_{CH}$ carrier wave) in the following manner. More specifically, in FIG. 5B, if a quaternary information symbol "11" is inputted when the $I_{CH}$ carrier wave is the phase 0 and the $Q_{CH}$ carrier wave is the amplitude 0, the carrier wave is controlled such that the $I_{CH}$ carrier wave remains in the phase 0 and the $Q_{CH}$ carrier wave changes from the amplitude 0 to the phase 0 in the first period of ½ time slot, and the $I_{CH}$ carrier wave changes from the phase 0 to the amplitude 0 and the $Q_{CH}$ carrier wave remains in the phase 0 in the second period of ½ time slot. The $I_{CH}$ carrier wave and the $Q_{CH}$ carrier wave thus obtained are combined. In FIG. 5B, if the quaternary information symbol "11" is inputted when the $I_{CH}$ carrier wave is the amplitude 0 and the $Q_{CH}$ carrier wave is the phase 0, the carrier wave is controlled such that the $I_{CH}$ carrier wave changes from the amplitude 0 to the phase $\pi$ and $Q_{CH}$ carrier wave remains in the amplitude 0 in the first period of ½ time slot, and the $I_{CH}$ carrier wave remains in the phase $\pi$ and the $Q_{CH}$ carrier wave changes from the phase $\pi$ to the amplitude 0 in the second period of ½ time slot.

Thus, it is temporarily determined whether the $I_{CH}$ carrier wave and the $Q_{CH}$ carrier wave corresponding to the quaternary information symbols in the preceding adjacent time slots are the phase $\pi$ or the amplitude 0, and how the phases of the $I_{CH}$ carrier wave and the $Q_{CH}$ carrier wave in the present time slot are to be changed by the quaternary information symbol of the present time slot.

More specifically, the carrier wave signal generated from the carrier wave signal generator 11 is applied to the $I_{CH}$ switching circuit 122, and the $Q_{CH}$ switching circuit 123 with the phase shifted, by $\pi/2$ rad, by the $\pi/2$ phase shifter 121. On the other hand, the RAM 132 is addressed by the addressing signal from the address generator 131, so that the instructions for controlling the $I_{CH}$ switching circuit 122 and the $Q_{CH}$ switching circuit 123 are read out from the RAM 132. The $I_{CH}$ driver 133 and the $Q_{CH}$ driver 134 control the $I_{CH}$ switching circuit 122 and the $Q_{CH}$ switching circuit 123 in response to the instructions.

More specifically, the address generator 131 generates the addressing signal in response to the quaternary information symbol in the present time slot and signals from the $I_{CH}$ driver 133 and the $Q_{CH}$ driver 134 in the preceding time slots, so that a memory cell in the RAM 132 corresponding to the addressing signal is addressed. The RAM 132 stores in advance the quaternary information symbol in the present time slot and signals to be generated from the $I_{CH}$ driver 133 and the $Q_{CH}$ driver 134 in response to the $I_{CH}$ carrier wave and the $Q_{CH}$ carrier wave in the preceding time slots. The RAM 132 outputs the signals based on the instructions and applies the same to the $I_{CH}$ driver 133 and the $Q_{CH}$ driver 134. The $I_{CH}$ driver 133 controls the $I_{CH}$ switching circuit 122 and the $Q_{CH}$ driver 134 controls the $Q_{CH}$ switching circuit 123, so that the predetermined $I_{CH}$ carrier wave and $Q_{CH}$ carrier wave are obtained.

Figure 7:
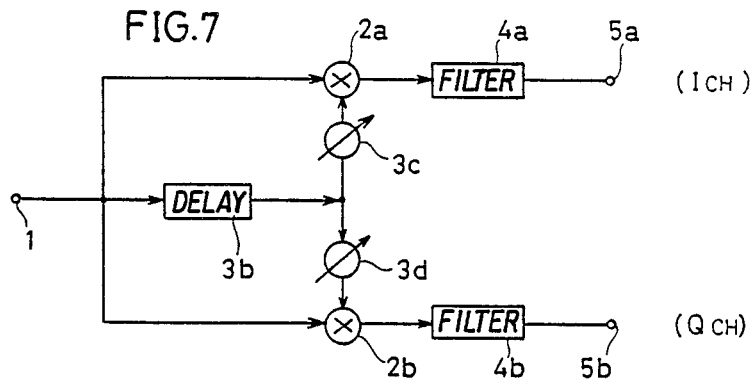
FIG. 7 is a schematic block diagram showing a structure of a T/2 delay circuit for demodulating a multi-valued DSK signal.

FIG. 7 is a schematic block diagram showing an example of a T/2 delay circuit for demodulating a multi-valued DSK signal generated. In FIG. 7, the multi-valued DSK signal inputted to an input terminal 1 is applied to a T/2 delay circuit 3b, a multiplier 2a for $I_{CH}$ and a multiplier 2b for $Q_{CH}$. The T/2 delay circuit 3b delays, by T/2, the multi-valued DSK signal, the output of the T/2 delay circuit 3b being applied to a first phase shifter 3c and a second phase shifter 3d. The second phase shifter 3d applies the amount of phase shift which is larger, by $\pi/2$ rad, than that of the first phase shifter 3c. The multiplier 2a for $I_{CH}$ multiplies the output of the T/2 delay circuit 3b by the multi-valued DSK signal, the product being outputted to an output terminal 5a through a low pass filter 4a as the $I_{CH}$ carrier wave. On the other hand, the multiplier 2b for $Q_{CH}$ multiplies the output of the second phase shifter 3d by the multi-valued DSK signal, the product being outputted to an output terminal 5b through the low pass filter 4b as the $Q_{CH}$ carrier wave.

The first phase shifter 3c and the second phase shifter 3d are adjusted such that the phase difference between signals outputted from the T/2 delay circuits 3b in the $I_{CH}$ multiplier 2a and the $Q_{CH}$ multiplier 2b is $\pi/2$ rad, resulting in the respective operations of the multipliers 2a and 2b having orthogonal relation. As is thus constructed, the upper half and the lower half of the circuit shown in FIG. 7 constitute the T/2 differential detectors, respectively, which are responsive to signals out of phase by $\pi/2$ rad in operation thereof.

Description is now made on operation of the circuit shown in FIG. 7. A signal obtained in the upper half of the circuit shown in FIG. 7 corresponds to an input signal which is delayed, by $\pi/2$ rad, from a signal obtained in the lower half. Thus, the signal obtained in the upper half corresponds to a signal of an I axis shown in FIG. 5B and the signal obtained in the lower half corresponds to a signal of the Q axis shown in FIG. 5B. As a result, the quaternary information symbol is obtained from change in the $I_{CH}$ carrier wave and the $Q_{CH}$ carrier wave in the first half and the second half of a time slot.

Although only an embodiment corresponding to the quaternary information symbol is described, according to the present invention, multi-valued (more than quaternary) information symbol can be used.

As described in the foregoing, since in the digital communication system according to the present invention, the digital information is represented by the multi-valued information symbol and the phase shift corresponding to each multi-valued information symbol is performed two times per ½ time slot in correspondence to each multi-valued information symbol, the effect of a DSK communication system can be obtained while controlling expansion of the bandwidth.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital communication system having an improved transmission bit error rate of multi-valued information symbols transmitted through a multipath environment having two transmission paths with different transmission propagation times, said multi-valued information symbols representing at least four states, said digital communication system comprising:

information symbol input means for receiving said multivalued information symbols;

carrier wave input means for receiving a carrier wave signal;

modulating means for shifting a phase of said carrier wave signal in response to said multi-valued information symbols input by said information symbol input means during a predetermined time interval, said phase shift of said carrier wave signal including two equal phase shifts occurring during respective first and second halves of said predetermined time interval, said two equal phase shifts being in the same direction and having a predetermined magnitude corresponding to respective ones of said multi-valued information symbols, said modulating means outputting said shifted carrier wave signal as a modulated output signal;

transmitting means for transmitting said modulated output signal from said modulation means through both paths of said multipath environment;

receiving means for receiving said transmitted signal from both paths of said multipath environment, said receiving means including means for dividing said received signal into two received output signals ; and demodulating means for delaying, by ½ of said predetermined time interval, one of two received output signals and multiplying the delayed signal by the other one of said two received output signals and integrating the result thereof so that the original binary information signal can be obtained.

2. A digital communication system having an improved transmission bit error rate of multi-valued information symbols transmitted through a multipath environment having two transmission paths with different transmission propagation times, said digital communication system comprising:

carrier wave input means for receiving a carrier wave signal;

information symbol input means;

modulating means for shifting a phase of said carrier wave signal in response to said multi-valued information symbols input by said information symbol input means during a predetermined time interval, said phase shift of said carrier wave signal including two equal phase shifts occurring during respective first and second halves of said predetermined time interval, said equal phase shifts being in the same direction and of a predetermined magnitude corresponding to respective ones of said multivalued information symbols, said modulating means outputting said shifted carrier wave signal as a modulated output signal;

transmitting means for transmitting said modulated output signal from said modulation means through both paths of said multipath environment;

receiving means for receiving said transmitted modulated output signal from both paths of said multipath environment and dividing said received signal into two received output signals; and demodulating means for delaying, by ½ of said predetermined time interval, one of two received output signals and multiplying the delayed signal by the other one of said two received output signals and integrating the result thereof so that the original binary information signal can be obtained, wherein said multi-valued information symbol is a quaternary information symbol (11, 01, 00, 10), and each of the two phase shifts per ½ time interval corresponding to said quaternary information symbol (11, 01, 00, 01) is represented by ($\pi/4$, $\tfrac{3}{4}\pi$, $5/4\pi$, $7/4\pi$).

3. A digital communication system in accordance with claim 1, further comprising:

carrier wave signal generating means for generating two carrier wave signals orthogonal to each other responsive to said received carrier wave signal, means for switching respective phases of said two carrier wave signals generated from said carrier wave signal generating means by 0 radian and $\pi$ radians responsive to an external control signal, selectively regulating a level of said two carrier wave signals to 100% and 0%, and outputting switched carrier wave signals therefrom;

combining means for combining said switched carrier wave signals outputted from said switching means to obtain said shifted carrier wave signal having a predetermined phase, and controlling means for generating a control signal to control the phase and amplitude of each of said carrier wave signals of said switching means in response to said multi-valued information signals.

* * * * *